(12) United States Patent
Jin

(10) Patent No.: US 8,357,857 B2
(45) Date of Patent: Jan. 22, 2013

(54) CABLE HOLDING DEVICE

(75) Inventor: Ji-Ying Jin, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 215 days.

(21) Appl. No.: 12/843,069

(22) Filed: Jul. 26, 2010

(65) Prior Publication Data

US 2011/0240342 A1  Oct. 6, 2011

(30) Foreign Application Priority Data

Mar. 30, 2010  (CN) .......................... 2010 1 0135903

(51) Int. Cl.
*H01B 7/00* (2006.01)
(52) U.S. Cl. ......................................... 174/135
(58) Field of Classification Search ................... 174/135; 242/405.1
See application file for complete search history.

(56) References Cited

U.S. PATENT DOCUMENTS

| | | | | |
|---|---|---|---|---|
| 4,858,846 A | * | 8/1989 | McDonald | 242/405.1 |
| 4,944,694 A | * | 7/1990 | Dorn | 439/501 |
| 6,953,896 B2 | * | 10/2005 | Kleeberger et al. | 174/72 A |
| 7,247,798 B2 | * | 7/2007 | Pagoto et al. | 174/138 E |
| 7,446,260 B2 | * | 11/2008 | Hammonds | 174/154 |
| 7,457,505 B2 | * | 11/2008 | Caveney | 385/135 |
| 7,637,771 B2 | * | 12/2009 | Laursen | 439/501 |

* cited by examiner

*Primary Examiner* — William Mayo, III
*Assistant Examiner* — Hiram E Gonzalez
(74) *Attorney, Agent, or Firm* — Altis Law Group, Inc.

(57) ABSTRACT

An exemplary cable holding device includes a supporting member and sliding bars. The supporting member includes a first sidewall, a second sidewall spaced from the first sidewall, and a bottom connecting the first sidewall to the second sidewall. Each of the first sidewall and the second sidewall defines through holes. Each bar slidably extends through a corresponding one of the through holes. The cables pass over ends of the sliding bars between the first sidewall and the second sidewall.

11 Claims, 3 Drawing Sheets

CABLE HOLDING DEVICE

BACKGROUND

1. Technical Field

The present disclosure relates to cable holding devices and, particularly, to a cable holding device for preventing cables from entangling.

2. Description of Related Art

Cables of many types connect various kinds of components such as personal computers, laptop computers, handheld electronic devices, external electronic storage devices, and other peripheral devices. These cables commonly transfer power and/or input and output signals between respective components. However, one problem with cables is entanglement. It is thus desirable to provide a device to solve the aforementioned problem.

BRIEF DESCRIPTION OF THE DRAWINGS

The components in the drawings are not necessarily drawn to scale, the emphasis instead being placed upon clearly illustrating the principles of an exemplary cable holding device. Moreover, in the drawings, like reference numerals designate corresponding parts throughout the views.

DETAILED DESCRIPTION

Figure 1:
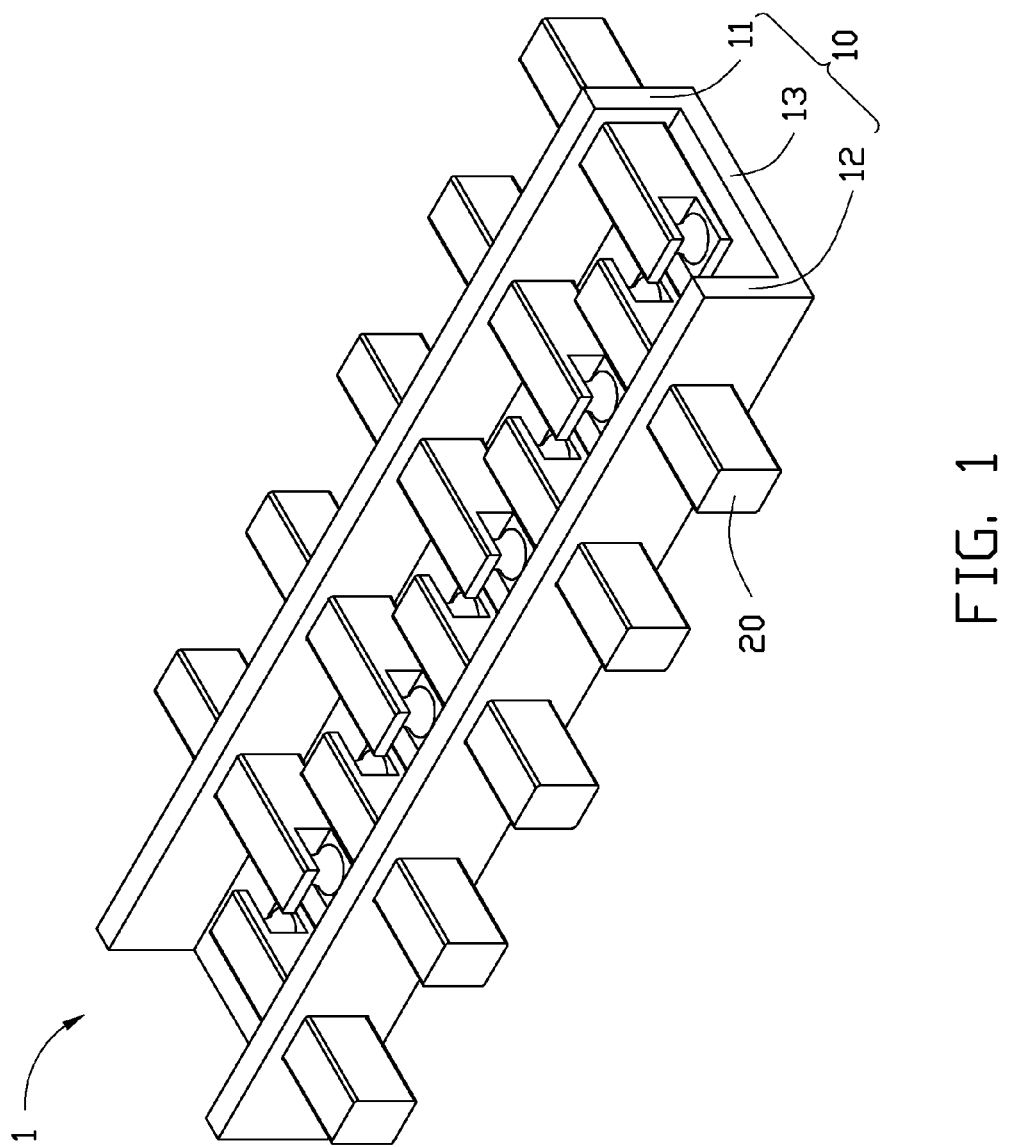
FIG. 1 is an isometric view of a cable holding device in accordance with an exemplary embodiment.
Figure 2:
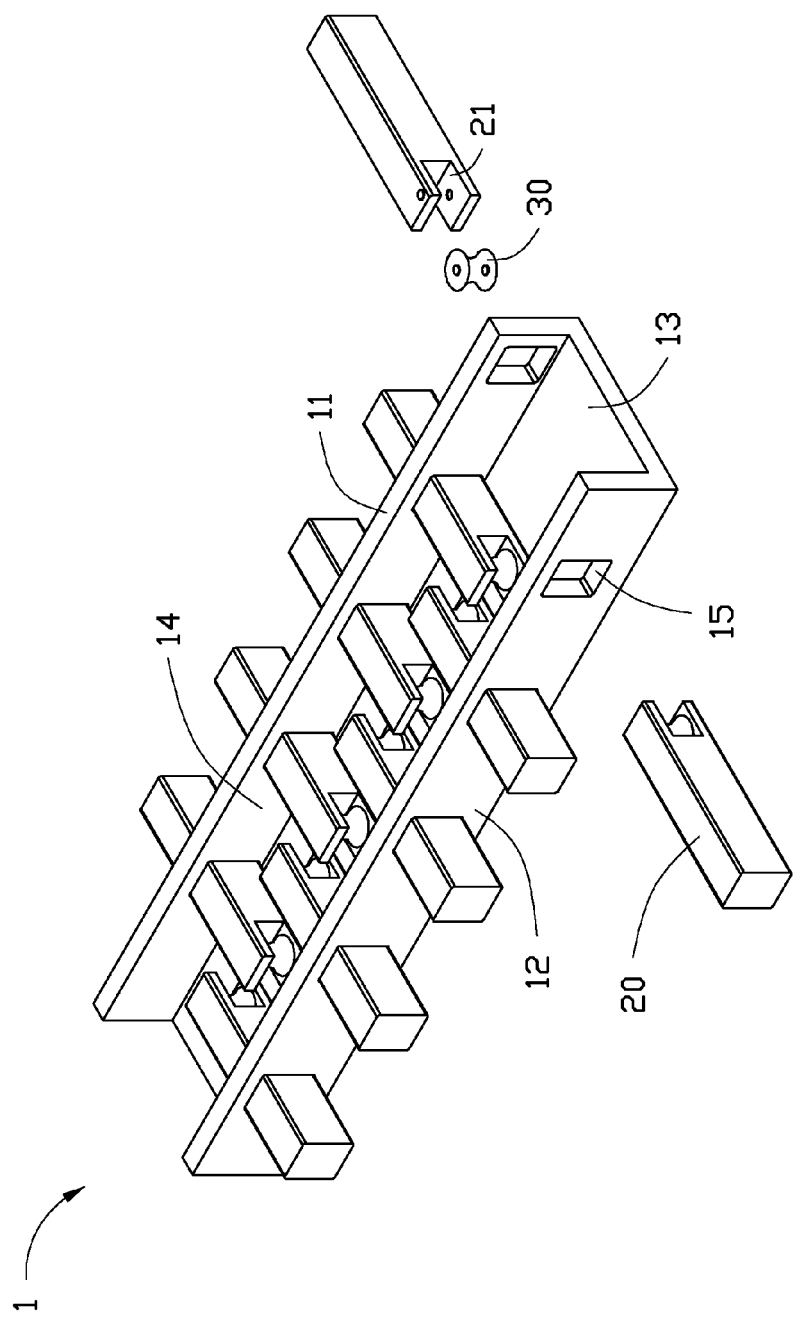
FIG. 2 is an exploded view of the cable holding device of FIG. 1.
Figure 3:
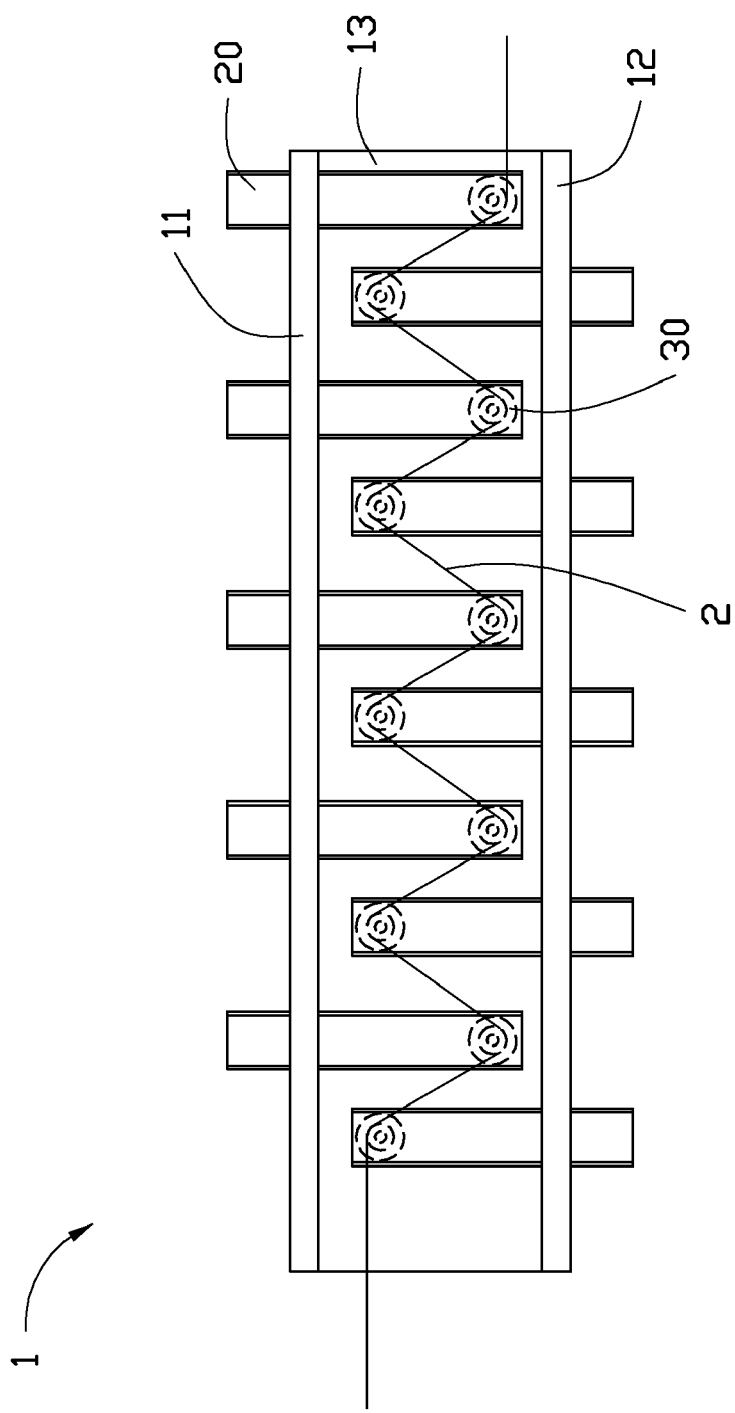
FIG. 3 is a top plan view of the cable holding device of FIG. 1, showing a working state of the cable holding device.

Embodiments of the present disclosure will now be described in detail below, with reference to the accompanying drawings. Referring to FIGS. 1-3, a cable holding device 1 includes a supporting member 10, a plurality of sliding bars 20, and a plurality of pulleys 30.

The supporting member 10 includes a first sidewall 11, a second sidewall 12 spaced from the first sidewall 11, and a bottom 13 connecting the first sidewall 11 to the second sidewall 12. The first sidewall 11, the second sidewall 12, and the bottom 13 cooperatively define a receiving room 14. In the embodiment, the sidewalls 11, 12 are substantially perpendicular to the bottom 13. The bottom 13 is substantially rectangular.

Each of the sidewalls 11, 12 defines at least one through hole 15. In the embodiment, each of the sidewalls 11, 12 defines a plurality of through holes 15. The through holes 15 are formed in positions substantially the same distance from the bottom 13. The through holes 15 along the sidewalls 11, 12 are alternately arranged along the longitudinal direction of the supporting member 10.

The number of sliding bars 20 is the same as the number of through holes 15. Each sliding bar 20 extends through one through hole 15 of one of the sidewalls 11, 12 into the receiving room 14 toward the opposite sidewall 11, 12. Each sliding bar 20 can slide in the through hole 15 relative to the supporting member 10. One end of each sliding bar 20 received in the receiving room 14 defines an opening 21. Each pulley 30 is received in one opening 21, and is rotatably connected to the sliding bar 20 by a pin (not shown). The pin passes through upper and lower sidewalls of the sliding bar 20 at the opening 21, and through the pulley 30. Each pulley 30 can have a shape similar to an hourglass. That is, the diameter of the pulley 30 gradually decreases from each of top and bottom ends toward the middle.

A cable 2 can pass over the pulleys 30 one by one from one end of the supporting member 10 to the opposite end. The cable 2 can be held tight or loose by pushing or pulling one or more of the bars 20. Part of the cable 2 is thus held within the receiving room 14. When plural cables 2 are held, each pulley 30 can define a plurality of annular grooves to respectively receive the cables 2.

Although the present disclosure has been specifically described on the basis of exemplary embodiments thereof, the disclosure is not to be construed as being limited thereto. Various changes or modifications may be made to the embodiments without departing from the scope and spirit of the disclosure.

What is claimed is:

1. A cable holding device, comprising:
   a supporting member comprising a first sidewall, a second sidewall spaced from the first sidewall, and a bottom extending between the first sidewall and the second sidewall, each of the first sidewall and the second sidewall defining at least one through hole;
   a plurality of sliding bars slidably extending through at least one through hole of the first sidewall and the second sidewall, respectively, wherein, when a cable passes over ends of the sliding bars between the first sidewall and the second sidewall in turn, the ends of the sliding bars between the first sidewall and the second sidewall cooperatively hold a cable passing from one end of the supporting member to the opposite end; and
   a plurality of pulleys, wherein each sliding bar comprises an inner end defining an opening, a respective one of the pulleys is rotatably received in the opening, and the pulleys are arranged to cooperatively hold the cable.

2. The cable holding device as described in claim 1, wherein the diameter of each pulley decreases from each of opposite ends thereof toward to the middle thereof.

3. The cable holding device as described in claim 1, wherein each of the pulleys is rotatably held in the opening by a pin.

4. The cable holding device, comprising:
   a supporting member comprising two parallel, opposite sidewalls, each of the sidewalls defining a plurality of through holes, the through holes of each of the sidewalls staggered relative to the through holes of the other sidewalls; and
   a same plurality of sliding bars slidably extending through the holes, respectively, wherein each sliding bar is adjustable such that an inner end of said each sliding bar of one of the sidewalls overlaps an inner end of a corresponding adjacent sliding bar of the other sidewall, the inner ends of all the sliding bars thereby capable of holding a cable passing through the supporting member.

5. The cable holding device as described in claim 4, further comprising a plurality of pulleys, wherein one end of each sliding bar defines an opening, a respective one of the pulleys is rotatably received in the opening, and the pulleys are arranged to cooperatively hold the cable.

6. The cable holding device as described in claim 5, wherein the diameter of each pulley decreases from each of opposite ends thereof toward to the middle thereof.

7. A cable holding device as described in claim 6, wherein the supporting member further comprises a bottom, the bottom extends between the opposite sidewalls, the through holes are formed in position substantially the same distance from the bottom.

8. The cable holding device as described in claim 7, wherein the opposite sidewalls and the bottom cooperatively define a receiving room, the ends of the sliding bars are received in the receiving room.

9. The cable holding device, comprising:
   a supporting member comprising two opposite sidewalls, each of the sidewalls defining a plurality of through holes, the through holes of two sidewalls arranged alternately relative to an axis of the supporting member running between the sidewalls; and
   a plurality of sliding bars slidably extending through the through holes, respectively, wherein the sliding bars are adjustable such that inner ends of the sliding bars are arranged to form a zigzag path running along the axis, the inner ends of the sliding bars thereby capable of holding at least one cable passing through the supporting member.

10. The cable holding device as described in claim 9, further comprising a plurality of pulleys, wherein the inner end of each sliding bar defines an opening, a respective one of the pulleys is rotatably received in the opening, and the pulleys are arranged to cooperatively hold the cable.

11. The cable holding device as described in claim 10, wherein the diameter of each pulley decreases from each of opposite ends thereof toward to the middle thereof.

* * * * *